(12) United States Patent
Logan et al.

(10) Patent No.: US 8,505,085 B2
(45) Date of Patent: Aug. 6, 2013

(54) FLEXIBLE AUTHENTICATION FOR ONLINE SERVICES WITH UNRELIABLE IDENTITY PROVIDERS

(75) Inventors: Angus P. D. Logan, Seattle, WA (US); Mark Ryland, Carnation, WA (US); Ariel Gordon, Kirkland, WA (US); Vittorio Bertocci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 13/082,403

(22) Filed: Apr. 8, 2011

(65) Prior Publication Data

US 2012/0260322 A1    Oct. 11, 2012

(51) Int. Cl.
*H04L 29/06* (2006.01)
(52) U.S. Cl.
USPC .............................................................. 726/9
(58) Field of Classification Search
USPC ................................................. 726/8, 9, 10, 5
See application file for complete search history.

(56) References Cited

U.S. PATENT DOCUMENTS

| | | | | |
|---|---|---|---|---|
| 7,428,641 | B2 * | 9/2008 | Allen | 713/182 |
| 7,487,539 | B2 | 2/2009 | Ramachandran et al. | |
| 7,657,639 | B2 | 2/2010 | Hinton | |
| 7,818,792 | B2 | 10/2010 | Shamsaasef et al. | |
| 2004/0230831 | A1 * | 11/2004 | Spelman et al. | 713/201 |
| 2010/0100465 | A1 | 4/2010 | Cooke et al. | |

OTHER PUBLICATIONS

Weeden, Shane B., "User Centric Identity with Tivoli Federated Identity Manager, Part 2: Self registration and account recovery using information cards and Open ID", retrieved at<<http://www.ibm.com/developerworks/tivoli/library/t-ucitfim2/index.html?ca=drs->>,Oct. 15, 2008, pp. 12.

Basney, et al., "Credential Wallets: A Classification of Credential Repositories Highlighting MyProxy", Retrieved at <<http://web-test.ncsa.illinois.edu/~jbasney/credentialwalletTPRC.doc>>, pp. 1-20, 2003.

Patterson, et al., "Federated Identity: Single Sign-On Among Enterprises", Retrieved at << http://developers.sun.com/identity/reference/techart/federated.html>>, Oct. 14, 2004, pp. 9.

Chappell, David, "Digital Identity for .NET Applications: A Technology Overview", Retrieved at <<http://msdn.microsoft.com/en-us/library/bb882216.aspx>>, Aug. 2007, pp. 25.

"Identity Assurance Assessment Framework", Retrieved at <<http://www.incommonfederation.org/docs/assurance/InC_IAAF_1.0_Final.pdf>>, Nov. 4, 2008, pp. 28.

* cited by examiner

*Primary Examiner* — Edward Zee
(74) *Attorney, Agent, or Firm* — Rau Patents, LLC (57) ABSTRACT

A flexible authentication system is described herein that fluidly switches between a federated authentication model and a local short-lived token model that does not require sophisticated authentication infrastructure at the relying party site. Upon detecting an event that causes the identity provider to be unavailable for authentication, the relying party switches to a temporary token model. The system generates a bearer token or challenge associated with the user's identity and (optionally) associated with time data that limits the period during which the token is valid. The relying party communicates the short-lived token to the user using contact information associated with the user and already stored by the relying party. Upon receiving the short-lived token, the user provides the short-lived token to the relying party, and the relying party processes the token to validate the user's identity and then allows the user to access the relying party's online services.

20 Claims, 4 Drawing Sheets

*FIG. 4*

FLEXIBLE AUTHENTICATION FOR ONLINE SERVICES WITH UNRELIABLE IDENTITY PROVIDERS

BACKGROUND

Identity is well understood in the physical world, but is a current challenge in the digital world. In the physical world, people present a passport at an airport's Immigration Desk, a driver's license to a police officer, a credit card to pay for a best-selling novel at a bookstore, and various other types of identification in a variety of situations. In the digital world, people may log onto websites using a username and password, provide shipping and credit card information to an online retailer, use a smartcard to log onto a corporate network, and so forth.

Despite their diversity, digital identities all have one thing in common: when transmitted on the network, every digital identity is represented by some kind of security token. A security token is just a set of bytes that expresses information about a digital identity. This information includes one or more claims asserted to be true by the token's issuer, each of which contains some part of the total information conveyed about this identity. A simple security token might include only a claim containing a username, while a more complex one might include claims containing a user's first name, last name, home address, and more. Security tokens for some digital identities might also include claims that contain sensitive information such as credit card numbers.

With most security systems, some information is provided in order to prove that these claims really do belong to the user presenting them. One simple (and currently very common) way to do this is to send a password along with the claims. A more powerful approach is for the user to prove claims ownership using a private key associated with a public key that has been signed along with the disclosed claims by the issuer. Regardless of the method, the security tokens that represent digital identities commonly provide some kind of proof that allows a receiver of the token to verify that this token really does represent the person or service presenting the token.

Numerous systems exist for providing digital identity and authentication. Rather than each website or service building and maintaining its own authentication system, federated authentication has become a popular paradigm. Using federated authentication, a relying party (RP) (e.g., a website that wants to differentiate its services based on the particular user) relies on an identity provider (IdP) to provide an initial digital identity for users by means of the identity provider's authentication service. The security token from the identity provider is presented to the relying party, which accepts that token as proof of the user's identity, and proceeds on that basis with its own user-relative features. For example, many websites now allow users to prove their identity using a token provided by an initial authenticated connection to Facebook.

More and more web sites are using identity federation to facilitate user registration and authentication. By allowing a visitor to reuse an existing digital identity, friction can be reduced and registration/logon rates can go up significantly. Sites that rely on third party identity providers to authenticate users are known as relying parties. Additional benefits to relying parties include a reduced cost for account management (e.g., lost password recovery, dealing with hijacked accounts, and so on) and the ability to leverage additional user-relative data from the identity provider such as a verified email address, personal identifiable information, social graph, and so forth. In other words, additional, often more valuable data can be accumulated in a user's profile without the cost and burden of full registration and account management machinery.

As more and more online services rely on federated authentication and, thus, identity providers, the risk of an outage at an identity provider making a large number of online services unavailable increases. An identity provider may suffer an outage for a variety of reasons, such as planned maintenance, hardware or software failures, natural disasters, severed communications infrastructure, or some local or transient communications outage that makes a particular user's client computer or relying party's computer unable to connect to the identity provider even though the identity provider is operating normally. Outages may also come in the form of an identity provider deleting a user's account or simply going out of business.

This wide range of possible outages mean that a relying party may suffer a derivative outage of all user-relative services over which it has no control because its users cannot authenticate themselves. In order to provide continuity of service, the relying party may feel compelled to build a parallel authentication infrastructure for authenticating users during identity provider outages. The former (failure of a relying party due to identity provider failures) is unacceptable to users, and the latter (building a back-up authentication system) defeats the offloading of development and maintenance effort that are the main purpose of federated authentication. A parallel authentication infrastructure that is rarely used may also create a weak link in security that can be exploited by malicious users.

In sum, one of the major weaknesses of the federated model is that relying parties take a dependency on the identity provider for user authentication. As a result, outage at an identity provider results in an inability for federated users of that identity provider to log on to the relying party's service. The risk of (small) identity providers going out of business or terminating user accounts (e.g., after a period of inactivity at the identity provider's site) also contribute to an increased risk for relying parties that rely on independent identity providers.

SUMMARY

A flexible authentication system is described herein that fluidly switches between a federated authentication model and a local short-lived bearer token model that does not require sophisticated authentication infrastructure at the relying party site. During normal operation, the system authenticates users of the relying party through federated authentication by contacting an identity provider and verifying the user's identity. Upon detecting an event that causes the identity provider to be unavailable for authentication, the system switches into a short-lived token model. The relying party accesses information associated with the user that can be used to send the user a short-lived token. The associated information is typically information that is already collected by the relying party, such as the users email address, mobile phone number, or other contact point associated with the user. The flexible authentication system generates a short-lived token that includes a claim about the user's identity. In some cases, the token may also include a time-based limitation or other claim that limits a period during which the token is valid. The relying party communicates the short-lived token to the user using the associated contact information already stored by the relying party.

Upon receiving the short-lived token, the user may click a link or take another action that passes the short-lived token from the user back to the relying party. The relying party processes the token to validate the user's identity and then allows the user to access the relying party's online services. Thus, the flexible authentication system allows relying parties to rely on independent identity providers without worrying that problems with the identity provider will lead to a bad user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A flexible authentication system is described herein that fluidly switches between a federated authentication model and a local temporary token model that does not require sophisticated authentication infrastructure at the relying party site. During normal operation, the system authenticates users of the relying party through federated authentication by contacting an identity provider and verifying the user's identity. Upon detecting an event that causes the identity provider to be unavailable for authentication, the system switches into a temporary bearer token model. The system may detect a failed connection to the identity provider, planned maintenance at the identity provider, or any other event that causes the relying party to be unable to successfully rely on the identity provider to provide authentication services for a limited period. The relying party accesses information associated with the user that can be used to send the user a temporary token. A temporary token as used herein may refer to a traditional concept of a security token as well as a process that includes sending a piece of data (e.g., a challenge) to a user, to which the user responds with another piece of information that is known out-of-band to the challenge. The associated information is information that is already collected by the relying party, such as the user's email address, mobile phone number, or other contact point associated with the user. The user-relative, associated information has two properties: (1) it is already known by the relying party, and (2) it is a means by which the relying party can communicate data (the bearer token) to the user in an out-of-band fashion.

The flexible authentication system generates a token that is internally correlated with the user's identity. For example, the token may encode a user identifier maintained by the relying party that is cryptographically protected such that the user identifier can only be read by the creator of the token. If the relying party receives the encrypted token back, the relying party can decode it and know the user's identity. In some cases, the token may also include a time-based limitation or other claim that limits a period during which the token is valid. For example, the relying party may generate short-lived tokens with a fixed lifetime (e.g., 15 minutes) or may dynamically set the lifetime based on an event, such as an expected duration of the identity provider's outage. The relying party communicates the token to the user using the associated information already stored by the relying party. For example, the relying party may email the short-lived token to the user. Upon receiving the token, the user may click a link or take another action that provides the token to the relying party. The relying party processes the token to validate the user's identity and then allows the user to access the relying party's online services.

In some cases, the relying party may limit the functionality the user can access if the process of communicating the token is relatively secure but not secure enough for some operations. For example, a bank website may allow a user with a short-lived token to view account balances, but not to transfer funds. Note that because the relying party is leveraging information already known by the relying party, other than the process of generating and communicating the token and comparing the time of its generation and use, the relying party is not building substantial authentication infrastructure. In particular, the relying party is not storing and managing passwords, validating passwords, handling password lifetime, and other burdens that many relying parties prefer to offload to identity providers. Rather, the relying party has a relatively simply process for handling identity provider outages that allows users to continue to securely access the relying party's services with limited inconvenience to the user. Thus, the flexible authentication system allows relying parties to rely on identity providers without worrying that problems with the identity provider will lead to a bad user experience.

The flexible authentication system can also be used to allow user account recovery in the case of hijacking or forgotten passwords, as well as transition between identity providers where one identity provider is no longer suitable or desirable to a relying party or user for providing authentication. A user that has forgotten his password can invoke the system at a relying party's site to receive a short-lived token that the user can use to add a new identity provider or establish other credentials. In the case of a permanently failed identity provider, the relying party can provide short-lived tokens to users through which users can associate with a new identity provider selected by the relying party or the user. The short-lived token provides the relying party with confidence that the user is whom he claims to be to allow operations that normally require more sophisticated authentication. In a distributed system using federated authentication, relying parties have no direct control over the availability of identity providers, yet the user cannot authenticate to the relying party's services if the identity provider is unavailable. The flexible authentication system allows the relying party to be dependent on the identity provider in common cases, but to also sever that dependency more easily in rare cases when an identity provider is temporarily or permanently no longer reliable. At the same time, the relying party need not build substantial user interfaces or authentication system for authentication that are better handled by identity providers.

The common way to mitigate identity provider outages today is for relying parties to ask their users to create additional, local credentials (e.g., a username and a password) to logon to the relying party in case the federated identity is not working (for any of the reasons expressed above). However, this solution (whether it is proposed at registration or later on) greatly increases the complexity of the user experience. This solution also increases the on-going attack surface of the relying party's site, since now on an on-going basis there two ways for attackers to gain illegitimate access to a user's account. The net result is that most relying parties have no "back up" solution to authenticate users when federated identity does not work. In part because of this problem, many web sites have decided not to deploy federated identity to avoid that dependency, and are taking a wait-and-see approach until the industry figures out a solution to the problem.

The flexible authentication system provides a solution that allows websites to rely on federated identity and offer a backup solution to authenticate users when the identity provider is unreliable, without the additional complexity of creating permanent, redundant local credentials. In some embodiments, the flexible authentication system is based on a link that the relying party sends to the user's email address or other contact point that will allow the user to login to the relying party's site for a given period of time (e.g., 15 minutes) without creating a local password or other credentials. The link contains a temporary token generated by the relying party and bound to the user (via the previously provided email address) and the period during which the token is valid.

The flexible authentication system relies upon the relying party having collected the federated user's email address or some other means of outbound communication directly to the user (such as a cellphone number for SMS messaging, or a phone number/voicemail for automated calling and robotic utterance of token information) before the outage. In most cases, relying parties can collect this information during the federated sign up process without increasing the complexity of the workflow. For federated users, relying parties ask users for their email address or other contact information if one is not on file, and may revalidate this information at regular intervals (e.g., every 12 months). In addition, relying parties can ask users for an alternate email address (which could be from a provider who is not the federated identity provider) and can offer the backup login method via any or all of the user's contact points. Using more than one address mitigates the problem of the same outage affecting the identity provider and a related email service.

Another positive aspect of the flexible authentication system is that it mirrors a common user flow that exists today around forgotten passwords. When users forget their passwords, they are often able to recover them by entering a flow that emails a temporary password to their email address. This solution provides a similar experience, yet without the on-going overhead of full-blown password management, password recovery, and account hijacking recovery.

Because identity provider outages are not very common, the flexible authentication system can be implemented via a "kill switch" methodology. The relying party can detect that a specific identity provider is down, and show the alternate login method for those users only during the outage. During such outages, relying parties can refuse new registration via the federation provider and only allow new users with other identity providers, or existing users to login via the backup solution. As part of this backup flow, the option to associate an additional Identity from an alternative identity provider ensures continued user access in the future and allows the user to transition from a permanently failed identity provider.

Figure 1:
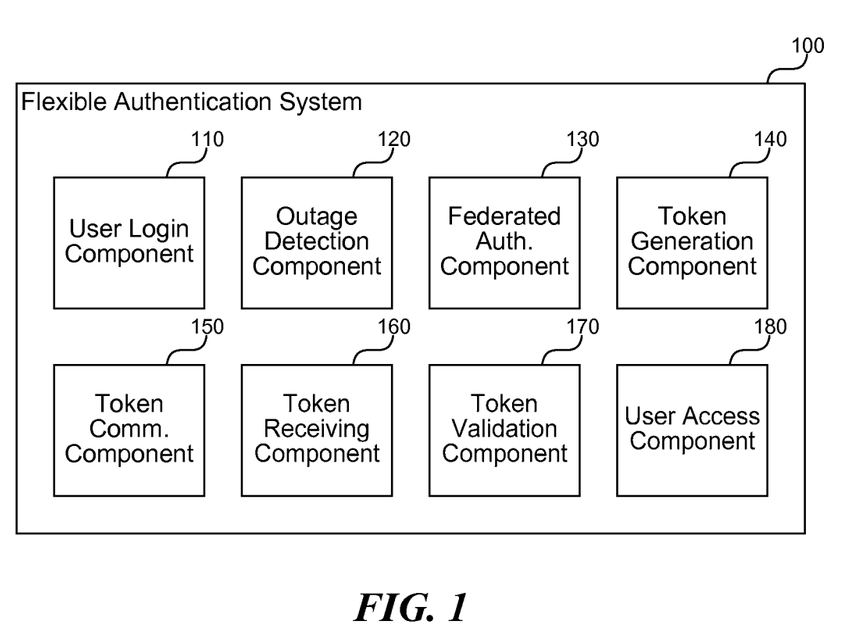
FIG. 1 is a block diagram that illustrates components of the flexible authentication system, in one embodiment.

FIG. 1 is a block diagram that illustrates components of the flexible authentication system, in one embodiment. The system 100 includes a user login component 110, an outage detection component 120, a federated authentication component 130, a token generation component 140, a token communication component 150, a token receiving component 160, a token validation component 170, and a user access component 180. Each of these components is described in further detail herein.

The user login component 110 receives requests to authenticate users to use one or more online services provided by a relying party. The component 110 normally is configured to require a security token from an independent identity provider. During normal operation, the system forwards the received authentication request to an identity provider to which the relying party defers authentication processing by invoking the federated authentication component 130. The identity provider may perform common or proprietary authentication procedures, and validates the user's identity so that the relying party can determine which online services the user is authorized to use. During abnormal operation, such as when an identity provider is unavailable, the user login component invokes the outage detection component 120 to detect and handle unavailability of the identity provider.

The outage detection component 120 detects an event that causes an identity provider that provides authentication services to the relying party to be unavailable for handling one or more received authentication requests. The outage detection component 120 may maintain a heartbeat or other direct communication with each identity provider, or the component 120 may simply detect failed requests for individual users to login. Upon detecting an outage or other unavailability, the component 120 invokes the token generation component 140 to begin the process of providing the user with a temporary token for accessing the online services of the relying party in the absence of the identity provider's services.

The federated authentication component 130 communicates authentication requests for the relying party that offloads authentication handling to the identity provider and receives an authentication response that verifies the user's digital identity. Those of ordinary skill in the art will recognize various ways to provide federated authentication. For example, users may only interact with the relying party, which handles all communication with the identity provider, or users may interact directly with the identity provider, which provides a signed token or other information to provide to the relying party for identity proof. OpeniD, WS-Federation, SAML-P, Kerberos, and other token granting mechanisms can be used with the system 100 to provide authentication during normal operation, when the identity provider is available.

The token generation component 140 generates a temporary token that correlates with user's digital identity, has a limited lifetime, and allows the user in possession of the token to access one or more online services of the relying party without authenticating with an identity provider and without the relying party permanently storing local security credentials on behalf of the user. The generated token may contain information such as the user's digital identity, a user profile identifier, a duration of the token's lifetime, and other information associated with the user or may simply contain an opaque identifier that the relying party can later use to correlate to the user's identity and other information. In some cases, the relying party places any information into the token that the relying party will need to authenticate the user when the user returns to access the online services of the relying party. In the case where the token is not just an opaque identifier, the system will normally use cryptographic mechanisms to ensure that the identifying information and timestamp cannot be read or altered while the token is in transit from the system back to the system. Even if the content of the token is an opaque identifier with no intrinsic meaning or value, cryptographic means may still be used to ensure that no tampering has occurred. Thus, the system can be implemented to put more information into the token so that the server stores less information (e.g., to increase scalability), or can be implemented to put less information into the token (e.g., making it more secure). Different implementers may choose to make this tradeoff differently without deviating from the scope of the description herein. After generating the token, the token generation component 140 invokes the token communication component 150 to provide the generated token to the appropriate user. The system 100 may provide a button or other user interface workflow or control through which the user can request generation and communication of a temporary token for accessing the relying party's services.

The token communication component 150 accesses information about a contact point associated with the user and communicates the generated temporary token to at least one contact point based on the accessed information. The contact point may include an email address, mobile phone number, regular voice number, voicemail number, street address, or any other place or manner of contacting the user. The user's ability to receive the token at the contact point validates the user's identity, and thus the relying party accepts a user's subsequent possession of the token as proof of the user's identity. The token communication component 150 may send an email, short message service (SMS) message, or other communication privately to a user and include the token as an attachment or as a link with a uniform resource locator (URL) that embeds the token (e.g., in a query string). Alternatively, the token can be communicated as any kind of difficult-to-guess data item, such as a lengthy passphrase left in a voicemail message. The user can respond by clicking the link or otherwise providing the token to the relying party through the token receiving component 160.

The token receiving component 160 receives a request from a user to access an online service of the relying party, wherein the request includes the token previously generated and communicated to the user at the one or more contact points. The online service may provide a user interface through which the user can login using either a set of credentials understood by a third-party identity provider or a temporary token generated by the relying party or online service. Alternatively or additionally, the relying party may provide a dedicated web page or other user interface, potentially having its own URL, through which users can logon with a received temporary token. This user interface provides the user with a way to access the relying party's services even when an identity provider relied on by the relying party is unavailable. Upon receiving the user token, the token receiving component 160 invokes the token validation component 170 to verify the token and user's identity.

The token validation component 170 validates a received token by determining the user identity associated with the token and verifying that the token is being used during the token's valid lifetime. In general, the relying party limits the duration of validity of such tokens because the tokens can be used to perform actions on behalf of the user by anyone that possesses the token. The communication method selected for providing the token to the user is selected to prevent others from receiving or accessing the token, but the more time the token is valid, the higher the likelihood for the user's email or other contact point to be hacked or otherwise compromised. Thus, the relying party may set a fixed expiration on generated tokens to reduce the potential attack surface for the misuse of such tokens. In some embodiments, the relying party may embed information about the reason for creation of the token, and expire the token dynamically based on whether the reason is still valid. For example, if the relying party created the token because a particular identity provider was unavailable, the relying party may stop accepting tokens associated with that event as soon as the identity provider is available again.

The user access component 180 provides users access to the online services of the relying party based on a received and validated temporary token or a successful federated authentication. The user access component 180 provides authorization services after the user's identity is known and has been proven through authentication (either by a federated identity provider or the temporary token process described herein). In some embodiments, the relying party may limit the services that users can use based on the manner of authentication. For example, a user authenticating using a temporary token may be unable to provide advanced operations or operations that modify data that a normally authenticated user would be able to perform. Conversely, the relying party may only allow certain actions to be performed, such as adding/deleting/changing identity providers by users that have been authenticated using a temporary token. The actions a user can perform after either type of authentication are implementation dependent and specific to the relying party's particular online services.

The computing device on which the flexible authentication system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, connected televisions, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
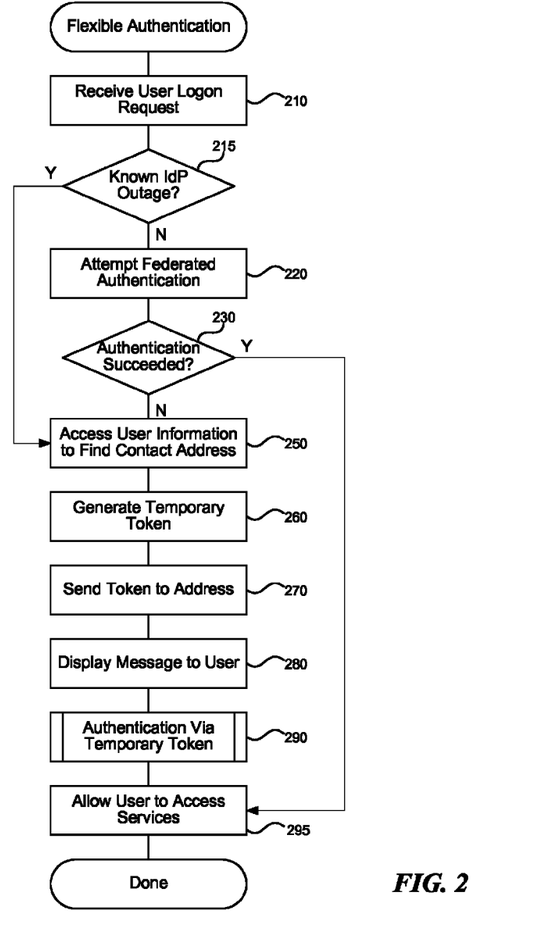
FIG. 2 is a flow diagram that illustrates processing of the flexible authentication system to authenticate a user to access one more online services, in one embodiment.

FIG. 2 is a flow diagram that illustrates processing of the flexible authentication system to authenticate a user to access one more online services, in one embodiment. Beginning in block 210, the system receives a request from a user to login to use an online service provided by a relying party. For example, the online service may include a web site, web services application programming interface (API), or other service available to the user from a network. The user request may include an initial set of information, such as credentials previously provided by an identity provider or information from a cookie or other storage resource at the user's client computer.

Continuing in decision block 215, if the relying party knows that a particular identity provider is unavailable, then the system jumps to block 250, else the system attempts federated authentication at block 220. The system may not attempt federated authentication upon each user login request. For example, if the relying party knows that a particular identity provider is down (e.g., through direct information or through multiple previous user login failures), the relying party may skip any authentication requests to that identity provider for a set period or until the identity provider is available again.

Continuing in block 220, in response to the received login request, the system attempts to perform federated authentication by communicating with an identity provider that can authenticate the user. The federated authentication may include sending credentials provided by the user from the relying party to the identity provider or directing the user to contact the identity provider directly to obtain a token for using the relying party's online services. Continuing in decision block 230, if federated authentication failed, then the system continues at block 250, else the system jumps to block 295.

Continuing in block 250, the system accesses user information stored by the relying party that includes at least one user contact address but does not include authentication credentials. For example, the contact address may include an email address, SMS number, phone number, or other contact point of the user. Authentication credentials include a password or other information used only for authenticating the user. Relying parties that use federated authentication do not typically store authentication credentials, but do store user contact information (such as email addresses) for other purposes. The system can use this contact information in the event of an identity provider outage to securely provide a temporary token to the user. In the event that no user information is available (not shown), the system may deny the user access to the services until the identity provider is available again.

Continuing in block 260, the system generates a temporary token that correlates with the user's identity. The user's identity may include additional information that allows for appropriate processing by the system upon return of the token from the user. The relying party may sign or encrypt the token so that upon receiving the token from a user, the relying party can validate that the token was issued by the relying party and that the information in the token has not been tampered with. The relying party can generate tokens cryptographically or using other means well known in the art.

Continuing in block 270, the system sends the generated temporary token to the user using the at least one contact address. For example, the system may email the token to the user and provide a link that the user can activate to navigate to the relying party's website and provide the token to one or more online services of the relying party. The system may present a user interface to the user for sending the token through which the user can select options, such as which of the user's methods of contact (e.g., email or a text message or voice) the system will use for sending the token. The system does not assume the user is whom he claims at this point, so the system hides personally identifiable information but provides generally applicable options.

Continuing in block 280, the system optionally displays a message or other indication to the user that the token has been sent. The indication may provide instructions to the user that instruct the user how to find and use the generated token. For example, the instructions may inform the user that email has been sent with the token to the user's email address, and that the user can access the online service by opening the email and obtaining the token. The user's ability to retrieve the token at a private contact address is considered sufficient verification of the user's identity to allow the user to login to the online service(s). The user's possession of the token thus becomes the basis of the authentication. In some embodiments, the system may request additional verification of the user's identity, such as by asking the user to verify other information about the user stored by the relying party, such as a home address, age, birthday, or other information. The user's possession of the token coupled with the user's ability to answer personal questions about the user provides further confidence that the user is who he claims to be. In some embodiments, information disclosed at this step is designed to avoid helping an attacker as well as being convenient for a valid user, and different implementations may decide on the proper approach given those two requirements that are often in tension with one another.

Figure 3:
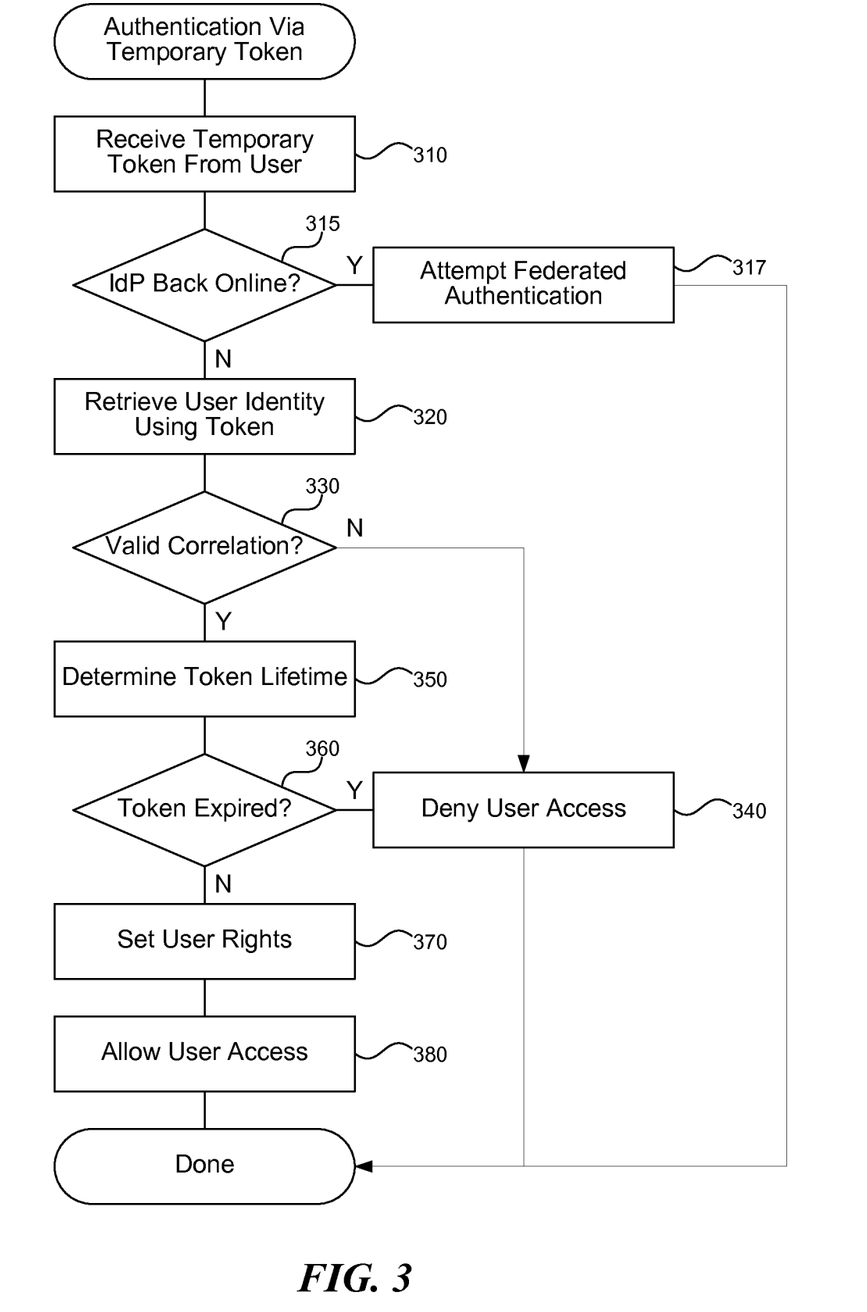
FIG. 3 is a flow diagram that illustrates processing of the flexible authentication system to authenticate a user to access a service when an identity provider for the user is unavailable, in one embodiment.

Continuing in block 290, the system receives the temporary token from the user and performs the backup authentication process described further with reference to FIG. 3. This process occurs later (potentially seconds or minutes later), after the user has had time to find and access the temporary token. Continuing in block 295, the system allows the user to access online services of the relying party based on either a successful authentication from the identity provider using federated authentication at block 230, or a successful authentication via the temporary token in block 290. After block 295, these steps conclude.

FIG. 3 is a flow diagram that illustrates processing of the flexible authentication system to authenticate a user to access a service when an identity provider for the user is unavailable, in one embodiment. Beginning in block 310, the system receives a temporary token from a user the token previously issued by a relying party operating an online service that normally relies upon a third-party identity provider to provide authentication services. For example, the user may obtain the token from an email or SMS message sent by the relying party upon determining that the identity provider was unavailable or could not authenticate the user. The relying party may receive the token back in a variety of ways. For example, it may provide a dedicated user interface on its website, or a dedicated URL for receiving authentication requests that use a temporary token. Alternatively, the relying party may have the user reply to the email or SMS with a user-generated challenge, and that challenge is then used to complete the temporary authentication at the system's point of service. In sum, there is a full communications "round-trip" between service and user that combines two distinct elements: a difficult (or, in the case of encrypted tokens, nearly impossible) to guess token, and a coincidence in time of a short duration. The combination of the data and time elements provides the simple, reasonably safe, temporary capabilities of the flexible authentication system.

Continuing in decision block 315, the system may optionally determine whether the identity provider with which the user would normally have authenticated is back online. If the identity provider is available, then the system continues at block 317 to attempt (or prompt the user to attempt) federated authentication with the identity provider. Although not shown, the system may perform steps similar to blocks 230 to 295 of FIG. 2 based on whether federated authentication is successful. If the logon succeeds, then the user is logged in and can use the service. If the logon does not succeed, the system may fall back on allowing the user to proceed with the temporary token as the source of authentication. Thus, the system may optionally make a decision at the last possible moment (rather than the first possible moment, which is when the alternative authentication flow begins) which mode of authentication to use.

Continuing in block 320, the system retrieves user identity information by associating the data in the token with data stored by the system associated with the user providing the token. The token is delivered to the user in a manner that the user's possession of the token provides a reliable level of verification of the user's identity. When the token is handed back, the system is able to determine the user's identity based on information encoded in the token. In addition, the system may ask the user to provide additional matching information to verify that the user is validly in possession of the token.

Continuing in decision block 330, if the system determines that the token is a token validly issued by the relying party, then the system continues at block 350, else the system continues at block 340. Continuing in block 340, the system denies access to the online service based on the invalidity of the received token. The token may be invalid because it has been tampered with, was not provided by the relying party, or because the user failed to provide verification of other information about the user to verify the user's identity. After block 340, the system completes.

Continuing in decision block 350, the system determines a valid lifetime of the received temporary token. Upon issuing the token, the relying party associates information with the token that indicates a time or condition under which the token will expire. For example, the token may expire after a set period (e.g., 20 minutes) or after an event occurs (e.g., the identity provider becomes available again). This temporal information could be created and managed internally within system without being stored in the token (for example, by the system tracking the time when the token was created and comparing that to the time that it is presented by the putative user), or some of the relevant data (such as creation time and duration) might be encoded in the token itself. This could allow certain efficiencies during the subsequent validation process.

Continuing in decision block 360, if the system determines that the token is expired, then the system continues at block 340, else the system continues at block 370. In block 340, if the token is expired, then the system denies access to the online service. Alternatively or additionally, the system may offer to allow the user to receive a new temporary token and may repeat the process described with reference to FIG. 2 to provide the user with a new token that is valid for a new period. The system may limit the number of times a user can request a temporary token (e.g., during a particular period, or after a certain number of authentication failures) or place other limitations that enhance system security.

Continuing in block 370, the system optionally sets the user's access rights based on the valid, unexpired token to allow the user to perform some or all of the actions that the user could provide with respect to the online service if the user was logged on using the identity provider. In some cases, the system may provide more or less access to a user logging on with a temporary token than a user logging on with an identity provider. The system may also skip this step and simply treat users authenticated using either method as validly logged on and able to perform the same actions. Continuing in block 380, the system allows the user to access the online service based on the user's access rights and the user's authenticated identity. After block 380, these steps conclude.

Figure 4:
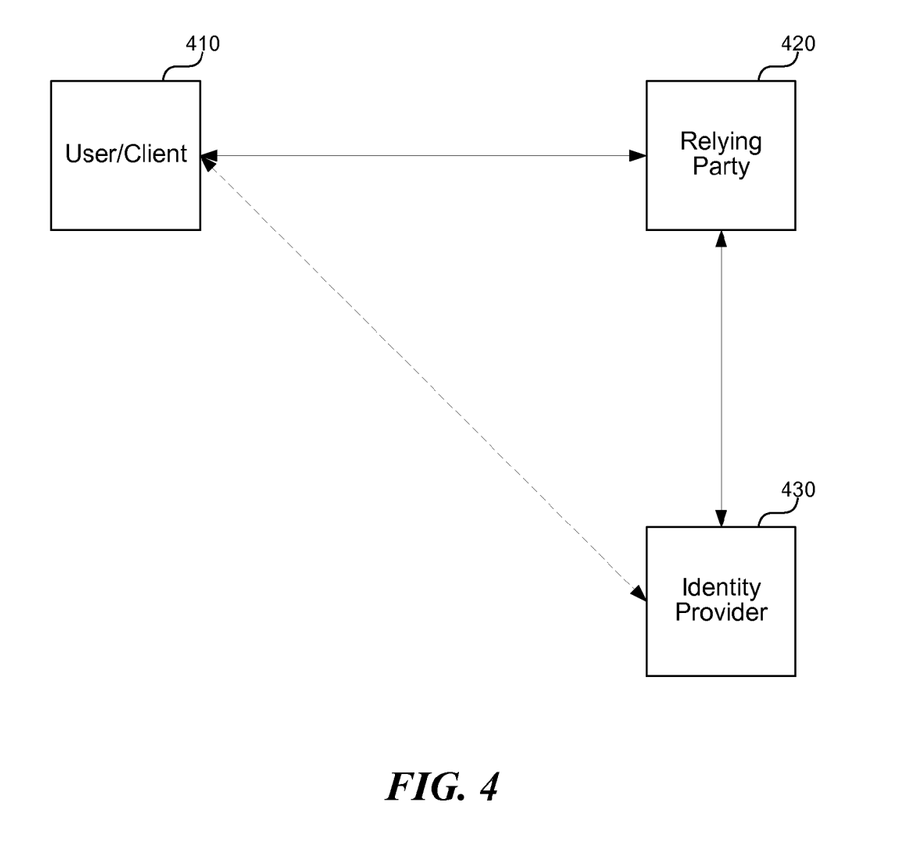
FIG. 4 is a block diagram that illustrates the relationship between the user, relying party, and identity provider, in one embodiment.

FIG. 4 is a block diagram that illustrates the relationship between the user, relying party, and identity provider, in one embodiment. The user 410 via a client computer sends a request to access online services to the relying party 420. The relying party 420 typically federates authentication to the identity provider 430. Although only one identity provider 430 is shown, the relying party 420 and user 410 may interact with more than one identity provider. Likewise, the relying party 420 interacts with potentially many users and the user 410 interacts with potentially many relying parties. The relying party 420 may directly connect to the identity provider 430 for federated authentication or may direct the user 410 to contact the identity provider 430 to verify the user's identity (e.g., by obtaining a token). When the identity provider 430 is unavailable, the user 410 communicates directly with the relying party 420 and the relying party 420 issues a temporary token to the user 410 that takes the place of the role normally provided by the identity provider 430.

In some embodiments, the flexible authentication system can be used to allow a user to transition between identity providers used by the relying party. For example, if the user's account with one identity provider has been deleted due to user inactivity or other reasons, the user can access the online service of the relying party, obtain a temporary token via the method described herein, and login to the online service to associate a new identity provider with the user's profile. This allows continuity of user access to the online service even in the face of identity providers going out of business or mishandling user accounts.

In some embodiments, the flexible authentication system issues a one-time token to the user for temporary access. In other words, instead of being valid for a set period, the token issued by the relying party may be valid for one use or some fixed number of uses. Similarly, the token lifetime may be dynamically based on an event, such as being valid until the identity provider is once again available; or a combination of two or more factors, such as an absolute expiration time and a policy that the token will not be accepted if the identity provider is available.

In some embodiments, the flexible authentication system verifies that a device that provides a temporary token is the same device that requested the temporary token. The system can do this in many ways, such as in the web browser as user agent case by placing a time-stamped cookie on the user's system when the token is requested and then verifying the cookie when the user provides the token to the relying party. Alternatively, a challenge message sent by SMS may require that a particular response be received from that same phone number. In ways like this, the system provides extra security by preventing someone else from hijacking the temporary token or challenge and using it to impersonate the user. Because a temporary token or challenge is often used only for a short time, restricting the user to the same device will not place an undue burden on the user.

In some embodiments, the flexible authentication system reduces functionality or access granted to a user that is logged in with a temporary token. For example, the system may prevent the user from performing certain actions or may limit the pages or other interfaces that the user can view. The system may also provide a way for the user to regain standard access. For example, if the system detects that the identity provider is once again available, then the system may prompt the user to perform the normal authentication process and restore the user to a more normal level of access rights.

In some embodiments, the flexible authentication system requests additional verification information from the user. For example, the system may ask the user to provide the temporary token and answer one or more personal questions based on information about the user already known by the relying party. As another example, the system may send one token to the user's email address and a numeric code or text string to the user's mobile phone. The system then grants access to the online service only after the user successfully provides all of the information. This may be implementation dependent as some relying parties will not need the extra security or will not want the burden of putting extra measures in place for outages that are expected to be rare.

From the foregoing, it will be appreciated that specific embodiments of the flexible authentication system have been described herein for purposes of illustration, but that various modifications may be made without deviating from the spirit and scope of the invention. Accordingly, the invention is not limited except as by the appended claims.

We claim:

1. A computer-implemented method for authenticating a user to access one or more online services, the method comprising:
   receiving a request from a user to login to use an online service provided by a relying party;
   in response to the received login request, attempting to perform federated authentication by communicating with an identity provider that can authenticate the user for the relying party; and
   upon determining that federated authentication failed due to unavailability of the identity provider,
   accessing user information stored by the relying party that includes at least one contact address for the user;
   generating a temporary token or challenge that correlates with: (1) duration information and (2) data associated with the user's identity; and
   sending the generated temporary token to the user using the at least one contact address,
   wherein the preceding steps are performed by at least one processor.

2. The method of claim 1 wherein receiving the request to login comprises receiving credentials previously provided by an identity provider for authenticating the user.

3. The method of claim 1 wherein attempting federated authentication comprises determining whether the identity provider is currently unavailable to provide authentication services.

4. The method of claim 1 wherein attempting federated authentication comprises determining whether a previous request to the identity provider was successful.

5. The method of claim 1 wherein the accessed user information does not include login credentials related to the user and stored by the relying party.

6. The method of claim 1 wherein the contact address is selected from the group consisting of: an email address, a mobile phone number, a voice mailbox, a land phone number, and a postal address associated with the user.

7. The method of claim 1 wherein generating a temporary token comprises creating token data that is an opaque identifier associated with data stored by the relying party that the relying party can use to identify the user's profile record for accessing the online service.

8. The method of claim 1 wherein the duration information associated with the temporary token defines the time and circumstances during which the temporary token is valid.

9. The method of claim 1 wherein the duration information associated with the temporary token provides for a one-time use of the temporary token.

10. The method of claim 1 wherein the duration information associated with the temporary token provides a set expiration time for the temporary token.

11. The method of claim 1 wherein the duration information associated with the temporary token provides a dynamically determined event for expiring the temporary token.

12. The method of claim 1 wherein sending the temporary token comprises sending the user a uniform resource locator that the user can activate to navigate to the relying party's website and provide the token to one or more online services of the relying party.

13. The method of claim 1 wherein sending the temporary token comprises sending the user a challenge that will allow the user to access the online service if the user can reply with a correct related response.

14. A flexible authentication system for authenticating a user in the event of an unreliable identity provider, the system comprising:
   a processor and memory configured to execute software instructions embodied within the following components;
   a user login component that receives requests to authenticate at least one user to use one or more online services provided by a relying party;
   an outage detection component that detects an event that causes an identity provider that provides authentication services to the relying party to be unavailable for handling one or more received authentication requests;
   a federated authentication component that sends to an identity provider authentication requests on behalf of the relying party that offloads authentication handling to the identity provider and receives an authentication response that verifies the at least one user's digital identity;
   a token generation component that generates a temporary token that validates the at least one user's digital identity, has a limited lifetime, and allows the at least one user in possession of the temporary token to access one or more online services of the relying party without authenticating with an identity provider and without the relying party storing local security credentials on behalf of the at least one user;
   a token communication component that accesses information about a contact point associated with the at least one user and communicates the generated temporary token to at least one contact point based on the accessed information;
   a token receiving component that receives a request from the at least one user to access an online service of the relying party, wherein the request includes the temporary token previously generated and communicated to the at least one user at the one or more contact points;
   a token validation component that validates the temporary token that was received by determining the user identity associated with the token and verifying that the token is being used during the token's valid lifetime; and
   a user access component that provides the at least one user access to the online services of the relying party based on the temporary token having been received and validated.

15. The system of claim 14 wherein the outage detection component, upon detecting an outage or other unavailability of the identity provider, invokes the token generation component to begin the process of providing the user with a short-lived temporary token for accessing the online services of the relying party in the absence of the identity provider's services.

16. The system of claim 14 wherein the token generation component generates a token that is a challenge associated with a user profile identifier and a duration of the token's lifetime to which the token receiving component receives a corresponding response.

17. The system of claim 14 wherein the token generation component, after generating the token, invokes the token communication component to provide the generated token to the appropriate user.

18. The system of claim 14 wherein the token communication component sends the token or other verification information to multiple contact points of the user and wherein the token receiving component asks the user for all of the information sent to each contact point to validate the user's identity.

19. The system of claim 14 wherein the token receiving component validates that a device providing the received token is the same device from which the user requested the temporary token.

20. A computer-readable storage device comprising instructions for controlling a computer system to authenticate a user to access a service while an identity provider for the user is unavailable, wherein the instructions, upon execution, cause a processor to perform actions comprising:

receiving a temporary token from the user, the temporary token previously issued by a relying party operating an online service that normally relies upon a third-party identity provider to provide authentication services;

determining that the third-party identity provider for the user is unavailable;

retrieving user identity information from the received temporary token that identifies a user profile stored by the relying party that is associated with the user providing the temporary token;

determining that the temporary token is a token validly issued by the relying party;

determining a valid lifetime of the received temporary token and that the temporary token is not expired; and when the temporary token is not expired, allowing the user to access the online service based on the user's access rights and the user's authenticated identity verified by the user's possession of the temporary token and without the relying party separately storing security credentials for the user.

\* \* \* \* \*